US011711820B2

(12) United States Patent
Nam et al.

(10) Patent No.: US 11,711,820 B2
(45) Date of Patent: Jul. 25, 2023

(54) DYNAMIC POWER SHARING IN A COMMUNICATIONS NETWORK

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/313,887

(22) Filed: May 6, 2021

(65) Prior Publication Data

US 2021/0360680 A1 Nov. 18, 2021

Related U.S. Application Data

(60) Provisional application No. 63/025,960, filed on May 15, 2020.

(51) Int. Cl.
*H04W 72/23* (2023.01)
*H04W 68/02* (2009.01)
*H04W 72/0446* (2023.01)

(52) U.S. Cl.
CPC .......... *H04W 72/23* (2023.01); *H04W 68/02* (2013.01); *H04W 72/0446* (2013.01)

(58) Field of Classification Search
CPC ............. H04W 72/14; H04W 72/0446; H04W 72/042; H04W 72/1289; H04W 68/02

USPC .......................................................... 370/336
See application file for complete search history.

(56) References Cited

U.S. PATENT DOCUMENTS

| 2011/0194478 A1* | 8/2011 | Lee ..................... H04W 74/002 370/312 |
| 2021/0100030 A1* | 4/2021 | Myung ............. H04W 74/0833 |
| 2021/0127355 A1* | 4/2021 | Gonzalez .............. H04W 68/02 |

(Continued)

OTHER PUBLICATIONS

International Search Report and Written Opinion—PCT/US2021/031384—ISA/EPO—dated Aug. 9, 2021.

(Continued)

*Primary Examiner* — Peter G Solinsky
(74) *Attorney, Agent, or Firm* — QUALCOMM Incorporated

(57) ABSTRACT

Aspects relate to the extension of cross-slot scheduling for power efficient paging between different New Radio (NR) operating platforms or environments. In some examples, the same paging downlink control information (DCI) may be shared between existing NR user equipment (UE) and new NR UE in different time slots, where a single paging DCI schedules multiple paging messages for each operating environment. In some examples, the same paging physical downlink control channel (PDCCH) occasion may be shared in existing NR and new NR operating environments for scheduling paging messages in different time slots, but different DCIs are used for scheduling the paging messages. In some examples, the same physical downlink shared channel (PDSCH) paging message may be shared in different slots between existing NR and new NR operating environments.

22 Claims, 15 Drawing Sheets

(56) References Cited

U.S. PATENT DOCUMENTS

2022/0264521 A1* 8/2022 Schmidt .............. H04W 68/005

OTHER PUBLICATIONS

LG Electronics: "Discussion on Power Saving Signal/Channel Function", 3GPP Draft, 3GPP TSG RAN WG1 90bis, R1-1717272 Discussion on Power Saving Signal-Channel Function_Final, 3rd Generation Partnership Project (3GPP), Mobile Competence Centre, 650, Route Des Lucioles, F-06921, Sophia-Antipolis Cedex, France, vol. RAN WG1, No. Prague, CZ, Oct. 9, 2017-Oct. 13, 2017, Sep. 29, 2017 (Sep. 29, 2017), XP051351705, 8 pages, Retrieved from the Internet: URL: http://www.3gpp.org/ftp/tsg_ran/WG1_RL1/TSGR1_90b/Docs/ [retrieved on Sep. 29, 2017] p. 5, paragraph 2.4—p. 7.

LG Electronics: "Design of Power Saving Signal/Channel", 3GPP Draft, 3GPP TSG RAN WG1 Meeting 90bis, R1-1717274, 3rd Generation Partnership Project (3GPP), Mobile Competence Centre, 650, Route Des Lucioles, F-06921, Sophia-Antipolis Cedex, France, vol. RAN WG1, No. Prague, CZ; Oct. 9, 2017-Oct. 13, 2017, Oct. 8, 2017 (Oct. 8, 2017), XP051340464, 9 pages, Retrieved from the Internet: URL: http://www.3gpp.org/ftp/Meetings_3GPP_SYNC/RAN1/Docs/ [retrieved on Oct. 8, 2017] p. 6.

LG Electronics: "Discussions on DCI and sPDCCH for Latency Reduction", 3GPP Draft, 3GPP TSG RAN WG1 Meeting #85, R1-164542 Discussions on DCI and sPDCCH for Latency Reduction, 3rd Generation Partnership Project (3GPP), Mobile Competence Centre, 650, Route Des Lucioles, F-06921, Sophia-Antipolis Cedex, France, vol. RAN WG1, No. Nanjing, China, May 23, 2016-May 27, 2016, May 14, 2016 (May 14, 2016), XP051096394, 6 pages, Retrieved from the Internet: URL: http://www.3gpp.org/ftp/tsg_ran/WG1_RL1/TSGR1_85/Docs/ [retrieved on May 14, 2016] p. 3, paragraph 3.2.

* cited by examiner (Paging with cross-slot scheduling)

DYNAMIC POWER SHARING IN A COMMUNICATIONS NETWORK

CROSS-REFERENCE TO RELATED APPLICATIONS

This application claims priority to provisional U.S. App. No. 63/025,960, filed on May 15, 2020 to Wooseok et al, titled "Dynamic Power Sharing in a Communications Network," the contents of which is incorporated by reference in its entirety herein.

TECHNICAL FIELD

The technology discussed below relates generally to wireless communication networks, and more particularly, to techniques for providing shared paging and scheduling capabilities.

INTRODUCTION

In wireless communication systems, such as those specified under standards for 5G New Radio (NR), an access point (e.g., a base station) may communicate with a user equipment (UE) (e.g., a smartphone). Dual Connectivity is a mode of operation where UEs equipped with multiple receivers and transmitters can be configured to utilize the radio resource of two distinct schedulers, located in two radio base stations (eNBs) configured as a master eNB and secondary eNB connected via a non-ideal back-haul over an X2 interface. In 5G NR configurations, a UE may connect to a Long-Term Evolution (LTE) base station and a 5G NR base station, where each base station may be configured as either a master node or a secondary node. In some configurations, the UE may have access to both LTE and 5G NR simultaneously.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method is disclosed of sharing paging messages in a scheduled entity. The method may include receiving paging control information for paging data, processing a time domain resource assignment in the paging control information, and receiving the paging data that includes first paging data in a first time slot, and second paging data in an offset time slot based on the time domain resource assignment.

Another example provides a scheduled entity for processing paging messages, the scheduled entity including a memory, a transceiver, and a processor, wherein the processor and the memory are configured to receive paging control information for paging data, process a time domain resource assignment in the paging control information, and receive the paging data that includes first paging data in a first time slot, and second paging data in an offset time slot based on the time domain resource assignment.

In another example, a method is disclosed of sharing paging messages in a scheduled entity. The method includes receiving first paging control information of a paging message in a first time slot, receiving second paging control information of the paging message in an offset time slot, processing a time domain resource assignment in the first paging control information and the second paging control information, and receiving paging data of the paging message in the offset time slot based on the time domain resource assignment.

Another example provides a scheduled entity for processing paging messages, the scheduled entity including a memory, a transceiver, and a processor, wherein the processor and the memory are configured to receive first paging control information of a paging message in a first time slot, receive second paging control information of the paging message in an offset time slot, process a time domain resource assignment in the first paging control information and the second paging control information, and receive paging data of the paging message in the offset time slot based on the time domain resource assignment.

These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

DETAILED DESCRIPTION

Figure 1:
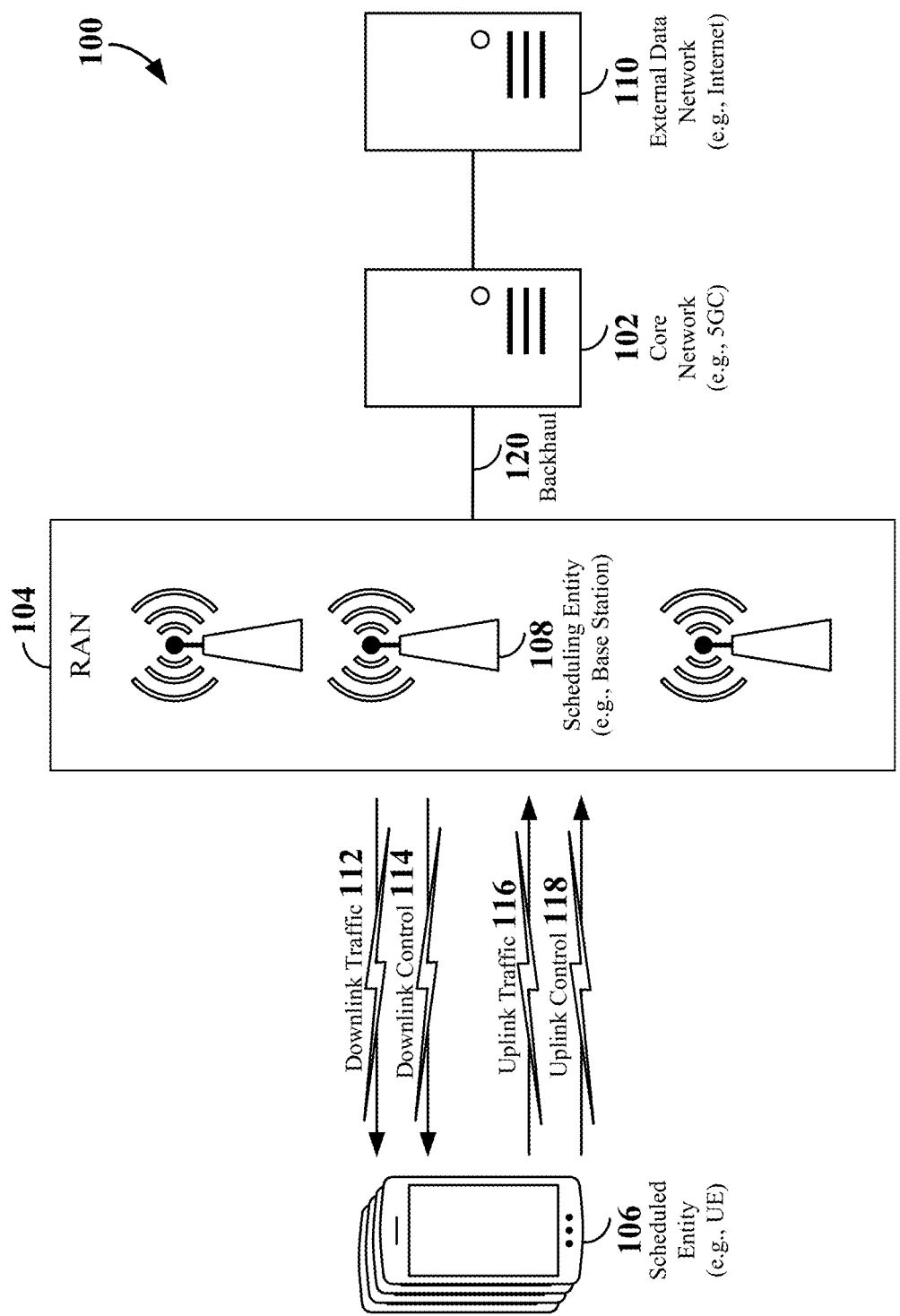
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Aspects of the present disclosure relate to the extension of cross-slot scheduling for power efficient paging between existing operating environments and new 5G NR operating environments. In some examples, the same paging downlink control information (DCI) may be shared between existing user equipment (UE) and new NR UE in different time slots, where a single paging DCI schedules multiple paging messages for each operating environment. In some examples, the same paging physical downlink control channel (PDCCH) occasion may be shared in existing and new 5G NR operating environments in different time slots, but different DCIs are used for decoding a paging message. In some examples, the same physical downlink shared channel (PDSCH) paging message may be shared in different slots between existing and new 5G NR operating environments.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
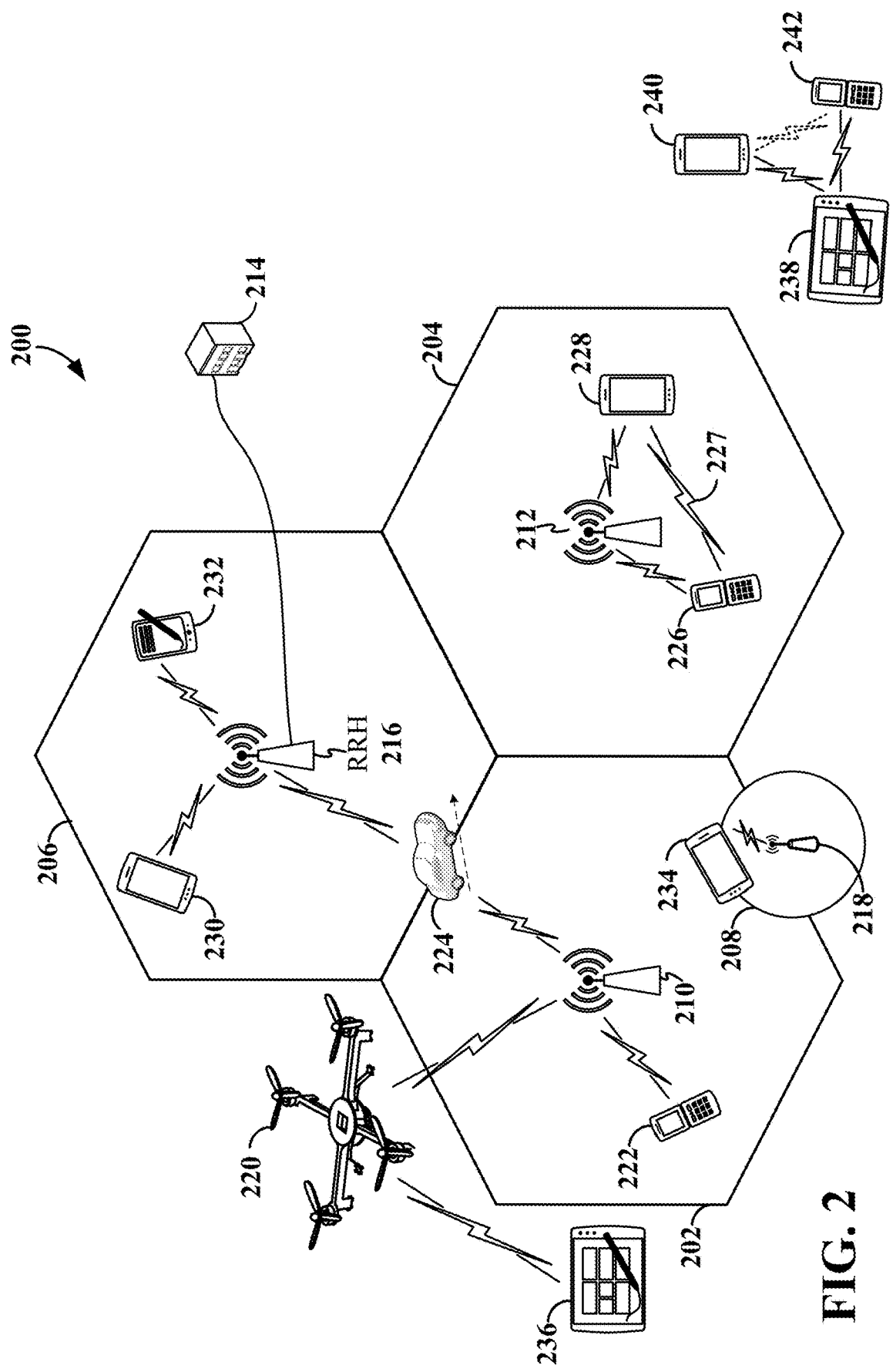
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
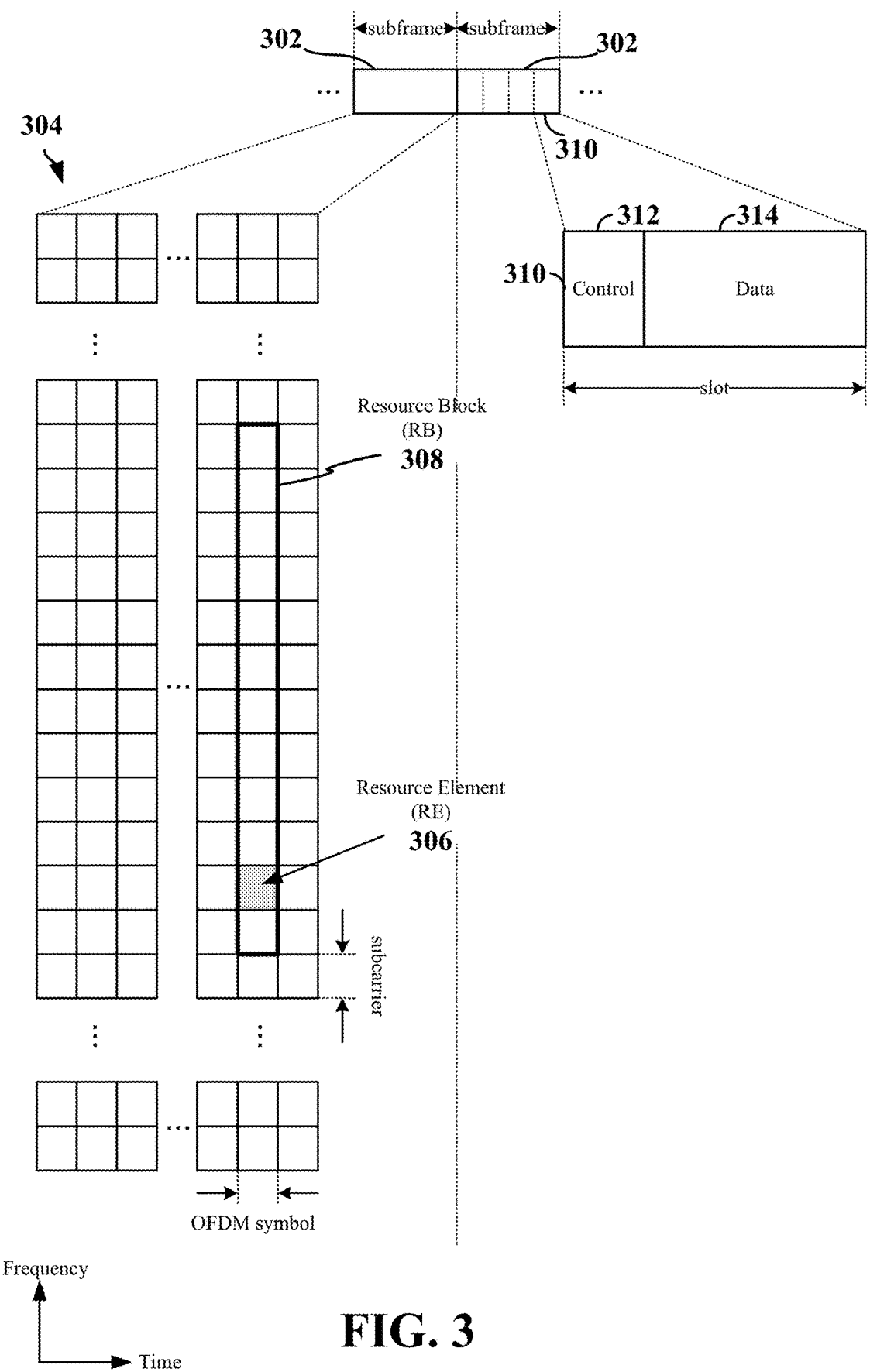
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
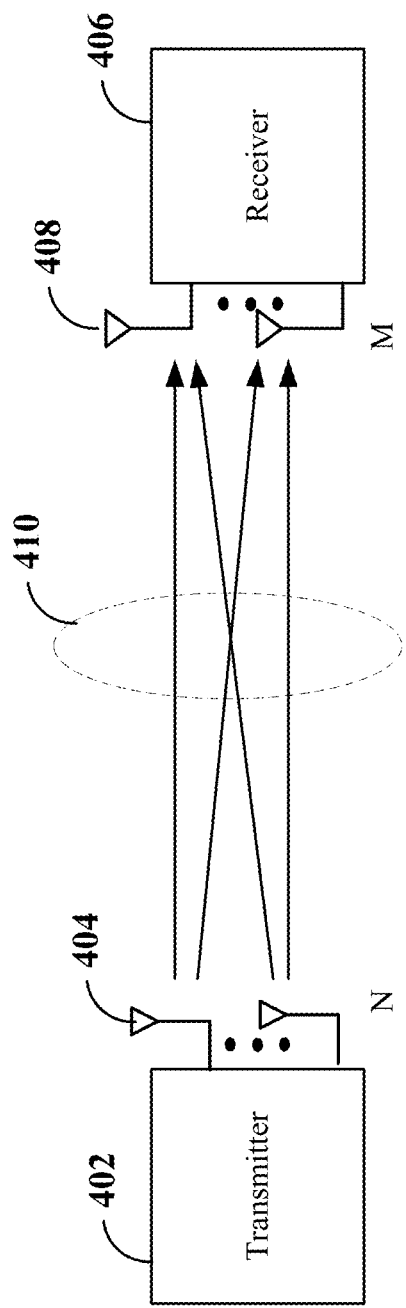
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In some examples, to select a particular beam for communication with a UE, the base station may transmit a reference signal, such as an SSB or channel state information reference signal (CSI-RS), on each of a plurality of beams (SSB beams) in a beam-sweeping manner. The UE may measure the reference signal received power (RSRP), reference signal received quality (RSRQ) or SINR on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

The radio protocol architecture for a radio access network, such as the radio access network 104 shown in FIG. 1 and/or the radio access network 200 shown in FIG. 2, may take on various forms depending on the particular application. An example of a radio protocol architecture for the user and control planes is illustrated FIG. 5.

Figure 5:
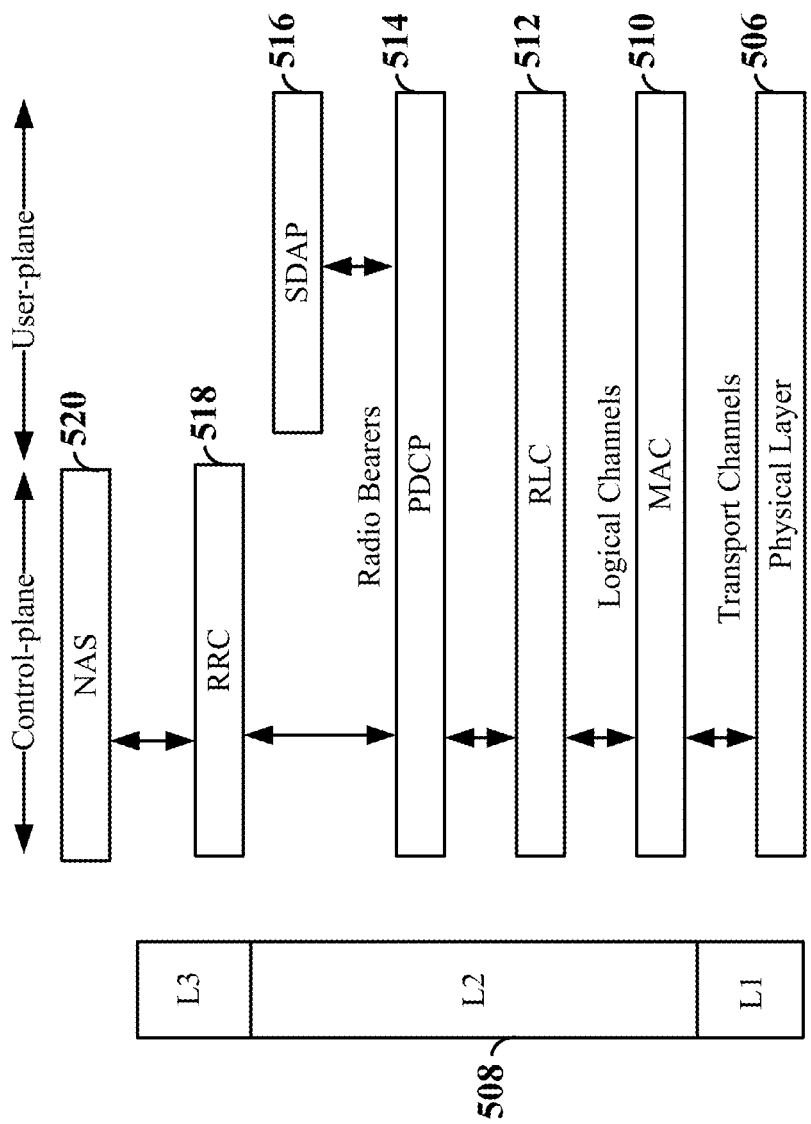
FIG. 5 is a block diagram illustrating a radio protocol architecture for the user and control planes according to some aspects.

As illustrated in FIG. 5, the radio protocol architecture for the UE and the base station includes three layers: layer 1 (L1), layer 2 (L2), and layer 3 (L3). L1 is the lowest layer and implements various physical layer signal processing functions. L1 will be referred to herein as the physical layer 506. L2 508 is above the physical layer 506 and is responsible for the link between the UE and base station over the physical layer 506.

In the user plane, the L2 layer 508 includes a media access control (MAC) layer 510, a radio link control (RLC) layer 512, a packet data convergence protocol (PDCP) 514 layer, and a service data adaptation protocol (SDAP) layer 516, which are terminated at the base station on the network side. Although not shown, the UE may have several upper layers above the L2 layer 508 including at least one network layer (e.g., IP layer and user data protocol (UDP) layer) that is terminated at the User Plane Function (UPF) on the network side and one or more application layers.

The SDAP layer 516 provides a mapping between a 5G core (5GC) quality of service (QoS) flow and a data radio bearer and performs QoS flow ID marking in both downlink and uplink packets. The PDCP layer 514 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 514 also provides header compression for upper layer data packets to reduce radio transmission overhead, security by ciphering the data packets, and integrity protection of data packets. A PDCP context may indicate whether PDCP duplication is utilized for a unicast connection.

The RLC layer 512 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 512. The MAC layer 510 provides multiplexing between logical and transport channels. The MAC layer 510 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 506 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 506 and L2 508 with the exception that there is no SDAP layer in the control plane and there is no header compression function for the control plane. The control plane also includes a radio resource control (RRC) layer 518 in L3 and a higher Non Access Stratum (NAS) layer 520. The RRC layer 518 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non Access Stratum (NAS). The RRC layer 518 is further responsible for QoS management, mobility management (e.g., handover, cell selection, inter-RAT mobility), UE measurement and reporting, and security functions. The NAS layer 520 is terminated at the AMF in the core network and performs various functions, such as authentication, registration management, and connection management.

During operation, DL channels and signals may be transmitted by gNBs to one or more UEs in either a broadcast or unicast mode. Downlink physical channels are configured to carry information originating from higher layers, including, but not limited to Physical Downlink Shared Channel (PDSCH), Physical Broadcast Channel (PBCH), and Physical Downlink Control Channel (PDCCH). The PDSCH carries DL unicast data and system broadcast messages, the PBCH carries information needed to access the cell, and the PDCCH carries scheduling information that enables the UE to locate its PDSCH. In 5G NR, the PDCCH can also convey short paging messages that may not involve the PDSCH. The MAC may determines which logical channels are mapped to which transport channels, and passes this information to the PHY. A logical channel type may be defined by what type of information is transferred; for example, paging control channel, broadcast control channel, and dedicated traffic channel. These are mapped to appropriate transport channels, such as paging control on paging channel (PCH), broadcast control on the broadcast channel (PBCH), dedicated traffic channel on the UL or DL shared channel (PUSCH or PDSCH), and so forth. A paging and system information notification (P-RNTI) may be provided on the PCH.

A UE may be either in RRC_CONNECTED state or in RRC_INACTIVE state when an RRC connection has been established. If this is not the case (i.e., no RRC connection is established), the UE may be in a RRC_IDLE state. During an RRC IDLE state, a UE-specific DRX may be configured by upper layers, and UE controlled mobility may be established based on a network configuration. The UE may monitor a paging channel for CN paging using a 5G S-temporary mobile subscription identifier (5G-S-TMSI), perform neighboring cell measurements and cell (re-)selection, acquire system information and can send SI requests, if configured. During a RRC_INACTIVE state, a UE-specific discontinuous reception (DRX) for power saving may be configured by upper layers, and UE controlled mobility may be established based on network configuration. The UE may store an AS context, and a RAN-based notification area is configured by the RRC layer. The UE may monitor a paging channel for CN paging using a shortened subscriber identity (5G-S-TMSI), perform neighboring cell measurements and cell (re-)selection, perform RAN-based notification area updates periodically when moving outside the configured RAN-based notification area, and acquire system information and send SI request (if configured). A RRC_CONNECTED state applies when 5GC-NG-RAN connection (both C/U-planes) is established for UE, where the UE AS context is stored in NG-RAN and the UE, and NG-RAN knows the cell which the UE belongs to. The UE monitors a paging channel, if configured, monitors control channels associated with the shared data channel to determine if data is scheduled for it, provides channel quality and feedback information, performs neighboring cell measurements and measurement reporting, and acquires system information.

During an IDLE or INACTIVE mode of operation, a UE may monitor a paging channel to receive paging message from a scheduling entity (e.g., base station) via PDCCH (e.g., DCI with CRC scrambled by P-RNTI) and corresponding PDSCH (e.g., paging message). In some examples, P-RNTI may common for all UEs, where the identity (IMSI) of the paged UE is included in the paging message information needed to access the cell, and the PDCCH carries scheduling information that enables the UE to locate its PDSCH. In NR, the PDCCH can also convey short paging messages that do not involve the PDSCH.

For an LTE (legacy) operating environment, a control reference signal (CRS) is transmitted relatively often, and the operating environment allows sample capture around a paging occasion (PO) and enables offline mode implementation. For an NR operating environment, there may be no CRS, or other "always-on" reference signals. Accordingly, reference signals may be received via SSB, for example, via a 20 msec periodicity as is. Under this configuration, there may be no offline mode due to potential large gap(s) between SSB and paging messages. During operation, a UE may wake up first to receive one or more SSBs (depending on channel conditions) and recover time/frequency synchronization. The UE may be configured to enter "light sleep" in between SSBs and/or POs, which may reduce deep sleep time and lead to multiple wake-up/go-to-sleep overhead. Such a configuration could lead to increased power consumption.

Figure 6:
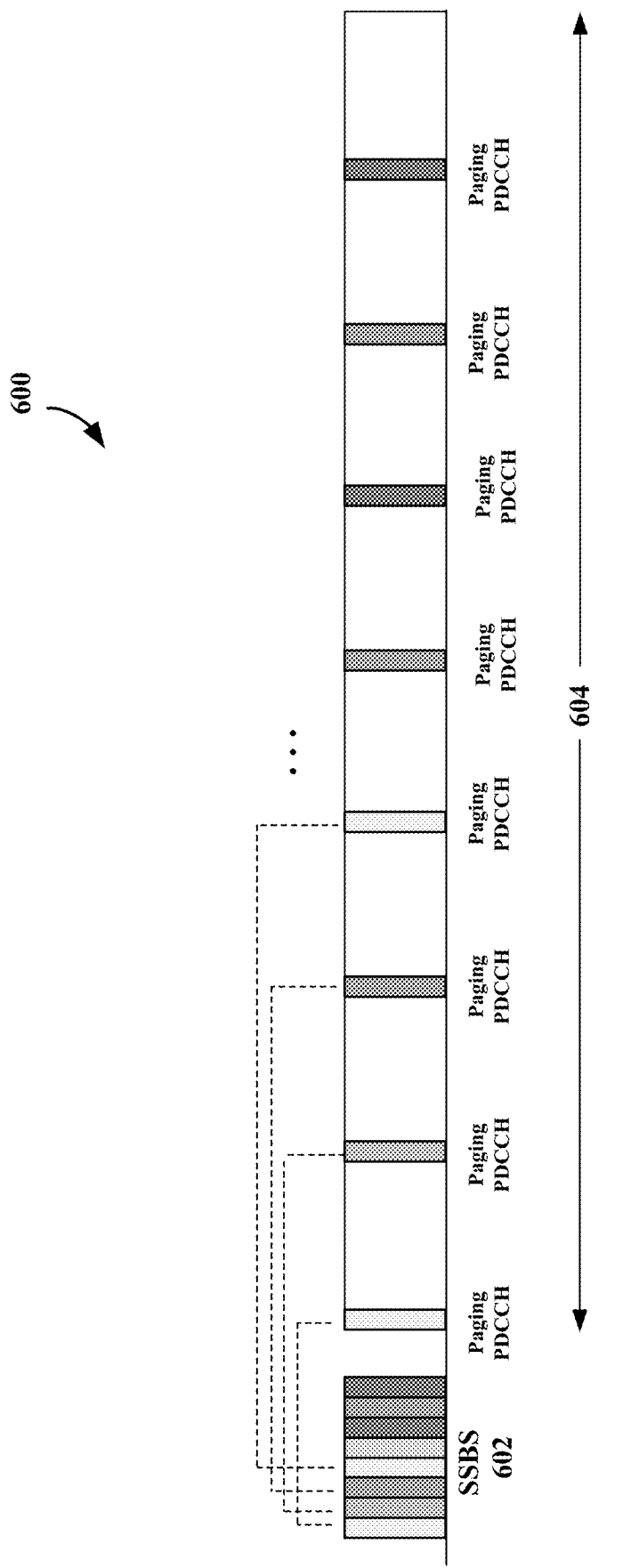
FIG. 6 shows a diagram illustrating beamformed paging SSBs and associated paging signals for UE decoding according to some aspects.

FIG. 6 shows a diagram 600 illustrating beamformed paging SSBs 602 and associated paging messages 604 for UE decoding in an existing 5G NR operating environment according to some aspects. Under some examples, a paging message may be beamformed. For FR2, up to 64 beamformed SSBs 602 may be transmitted. Therefore, up to 64 beamformed copies of the paging message, with a one-to-one correspondence to the SSBs (shown as dotted lines) will be transmitted. The UE may select the best beam based on the SSBs and decode the corresponding page message.

UE power saving paging enhancements may be configured to provide enhancements to IDLE/INACTIVE mode UE power saving and reduce unnecessary UE paging receptions, which have minimal or no impact on legacy (LTE) UEs. By specifying technologies and techniques to provide potential PT-RS (hereinafter referred to more simply as tracking reference signal (TRS)) and/or CSI-RS occasions available in CONNECTED mode to IDLE/INACTIVE mode UEs, system overhead impact can be reduced.

With regard to paging enhancement, when a UE detects a paging PDCCH with P-RNTI, it is not known whether the paging is intended for the UE itself. After finishing decoding the paging message (e.g., received in a PDSCH), the UE may identify whether the paging is addressed to it or not. If the paging is not addressed to the UE, the effort for paging message decoding is wasted. Accordingly, smaller paging groups with different P-RNTI, or paging groups with a new paging DCI and group ID, can be used to reduce unnecessary paging. With regard to tracking for IDLE/INACTIVE mode UEs in NR, there is no "always-on" reference signal (e.g., CRS in LTE) in NR to track UEs in this manner, and UE-specific reference signals, such as TRS and CSI-RS, are configured only for CONNECTED mode UEs. However, by allowing TRS/CSI-RS measurement for IDLE/INACTIVE mode UEs, the network can rely less on SSB for tracking, which can improve overall UE power efficiency and allow an early indication for a UE to monitor and/or detect PDCCH for a target paging occasion (PO).

Figure 7:
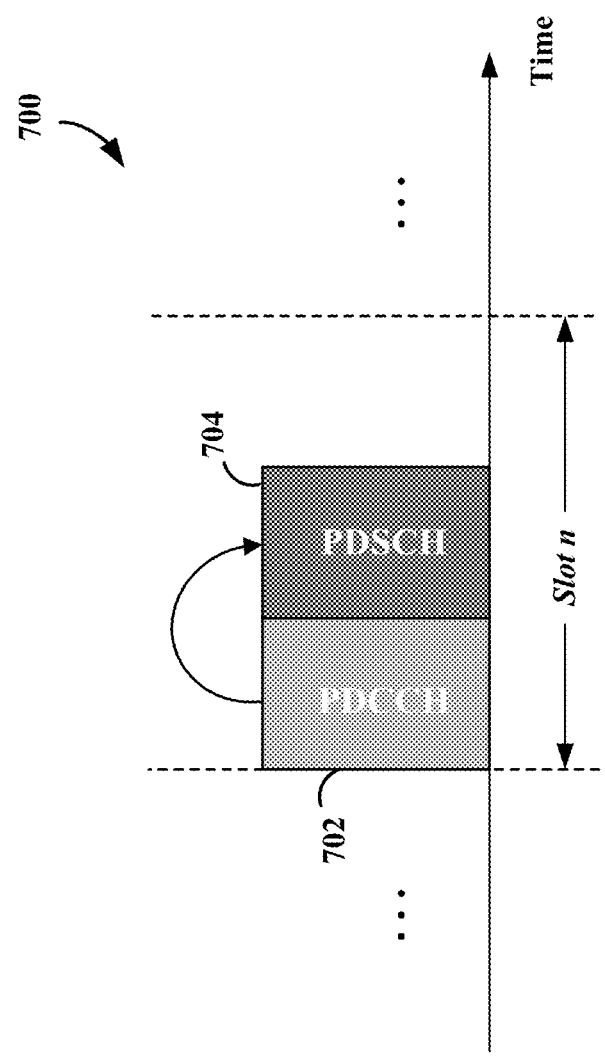
FIG. 7 shows a paging signal for an LTE operating environment according to some aspects.

FIG. 7 shows a paging message 700 for a first NR operating platform or environment (e.g., an existing 5G NR operating platform configured according to 3GPP NR Rel-15 or Rel-16 specifications) according to some aspects. The paging message 700 in this example is provided in the scheduling PDCCH 702 and PDSCH 704 in the same slot (slot n). Here, the UE may only buffer received (Rx) information in a paging slot (e.g., slot n) to capture potential paging DCI. In first platform NR (e.g., existing NR) paging, both potential PDCCH and PDSCH may be buffered. In the example shown in FIG. 7, the UE may process the PDCCH for paging DCI detection and, if a paging DCI is detected, the UE proceeds with processing the paging data (buffered PDSCH). Otherwise, the UE may discard the buffered PDSCH. In the example shown in FIG. 7, the paging data is received in the same paging slot. In other examples, new 5G NR platforms (e.g., 5G NR operating platforms configured according to 3GPP Rel-17 or later specifications) may provide enhanced paging in which the paging data may be received at K0 (scheduling offset) slots later from the PDCCH.

Figure 8:
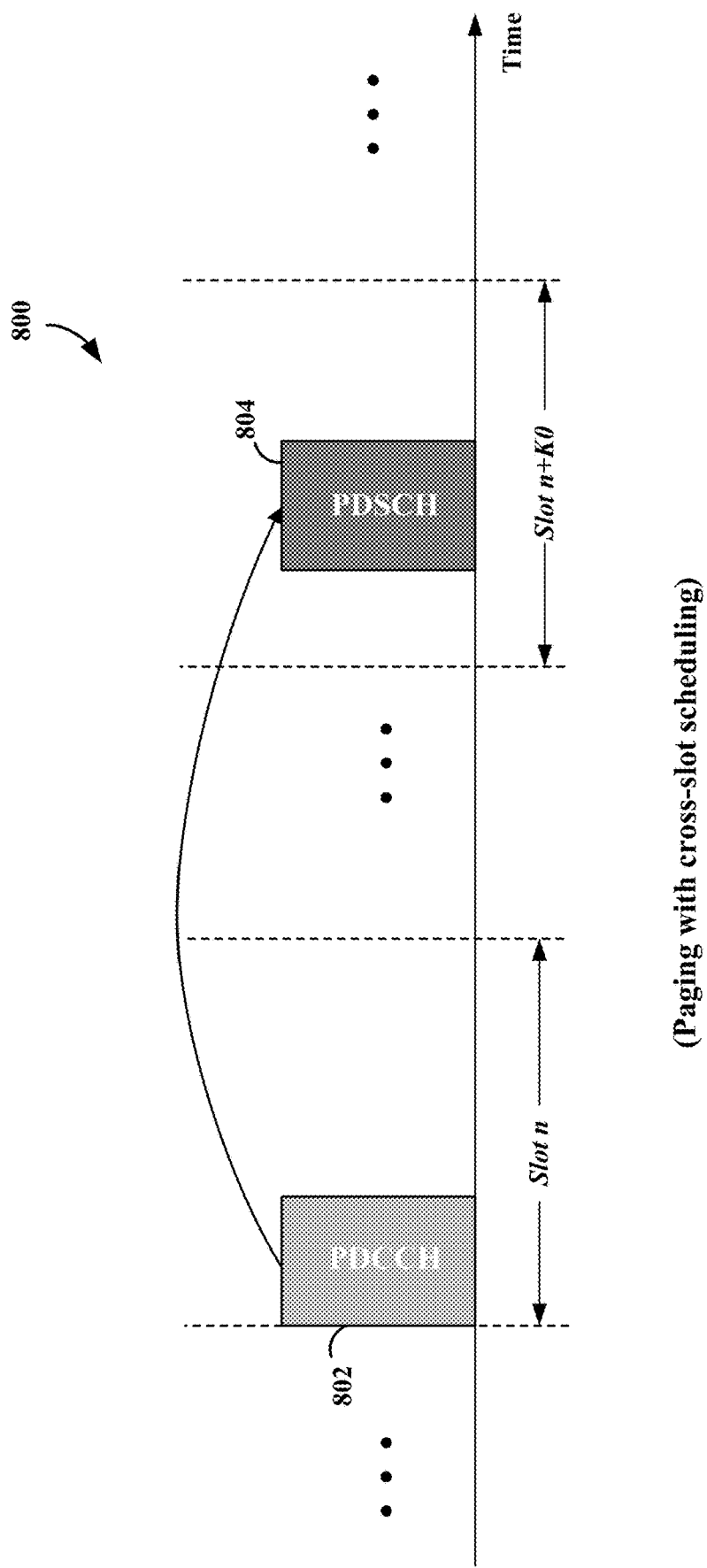
FIG. 8 shows a diagram of cross-slot scheduling of a paging message in a PDCCH of a first slot, where the paging message is received and processed in a PDSCH of an offset slot according to some aspects.

This configuration of enhanced paging is illustrated in FIG. 8, which shows a diagram 800 of cross-slot scheduling of a paging message in a PDCCH 802 of a first slot (slot n). The paging data may then be received and processed in a PDSCH 804 of an offset slot (slot n+K0). Cross-slot scheduling may be utilized for power efficient paging. If a paging DCI is not detected, the UE goes to sleep. However, UEs using the existing platform for NR-based paging and the new platform for NR-based enhanced paging (cross-slot scheduling) may share the same paging occasion (PO). Accordingly, different options of PO sharing different platforms of existing and new NR-based paging may be configured.

Figure 9:
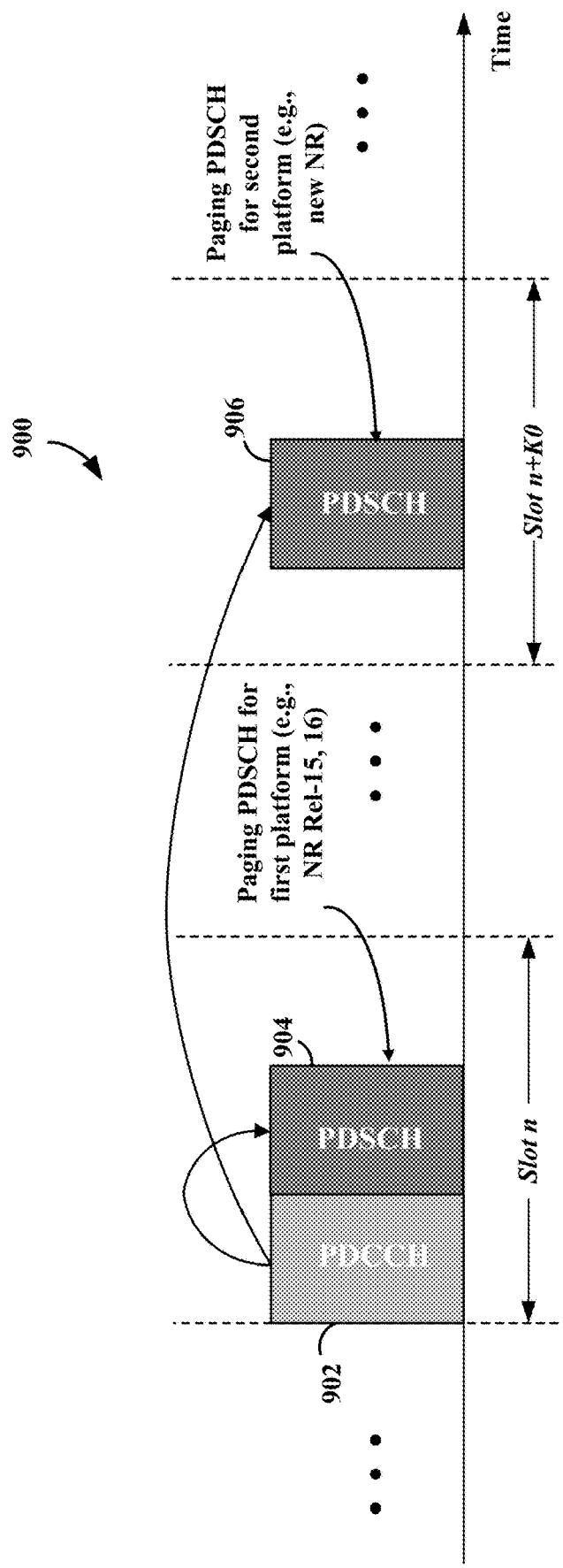
FIG. 9 shows a diagram illustrating paging occasion (PO) sharing for paging messages between an LTE-based operating environment and a NR-based operating environment according to some aspects.

FIG. 9 shows a diagram 900 illustrating PO sharing for paging messages between a first platform NR-based operating environment (e.g., Rel-15, Rel-16) and a second platform NR-based operating environment (e.g., Rel-17 and later) according to some aspects. This example demonstrates paging DCI sharing, where the same paging DCI (e.g., same P-RNTI and same DCI format) may be shared between communications from different wireless communication platforms. In this example, a first paging message, including paging control information (paging DCI) and paging data, is received in slot n, as shown. For example, the paging control information (paging DCI) of the first paging message is received by a NR UE of a first platform in PDCCH 902 and the paging data of the first paging message is processed by the first platform NR UE in PDSCH 904 of slot n as shown. However, the PDCCH 902 may also be shared with a second paging message including paging data (e.g., PDSCH 906) for a second-platform NR UE in an adjacent time slot (slot n+K0) as shown in the figure. Here, a single paging DCI may be configured to schedule multiple PDSCH (904, 906) between the different platforms.

In some examples, time domain resource allocation (or time domain resource assignment (TDRA)) may be utilized for sharing paging messages. Signaling of time domain resources to a scheduled entity informs the scheduled entity about which slots/symbols data may be transmitted and/or received. Resource allocation may be performed dynamically or in a semi-persistent manner. Dynamic scheduling in the uplink may be performed using PDCCH DCI. For semi-persistent scheduling, PDCCH DCI or RRC signaling may be used. In some examples, PDCCH DCI is used for both dynamic and Semi-Persistent Scheduling (SPS) in the downlink. DCI formats 1_0 and 1_1 may be used to dynamically allocate time-domain resources for PDSCH. In the case of dynamic scheduling, PDCCH carrying DCI 1_0 and 1_1 are in general addressed to either C-RNTI or MCS-C-RNTI. Other RNTIs such as SI-RNTI, P-RNTI, Temporary C-RNTI, and RA-RNTI may also be used for this purpose. DCI formats 1_0 and 1_1 may carry a multi-bit (e.g., 4-bit) field for time domain resource assignment that points to one of the rows of a look-up table that provides parameters for resource allocation. These parameters may include slot offset K0, which may be used to derive the slot in which PDSCH reception occurs. When K0=0, PDSCH reception is intended within the same slot where DCI is received. When allocation and PDSCH transmission are contained in the same slot, it may be considered a self-contained slot. Another parameter may include jointly coded Start and Length Indicator Values (SLIV), or individual values for the start symbol S (first symbol in the slot in which PDSCH will be received) and the allocation length L (allocation length in number of OFDM symbols). Additionally, a PDSCH mapping type (e.g., Type A or Type B) may be assumed on the PDSCH reception.

A TDRA field in the DCI may be differently interpreted by existing NR UEs and new NR UEs. For example, different TDRA tables that are used for paging may also be used by both the existing NR UEs and new NR UEs. Thus, in some examples, a single paging DCI may schedule multiple paging message (e.g., one for existing NR UE and another for new NR UE).

Figure 10:
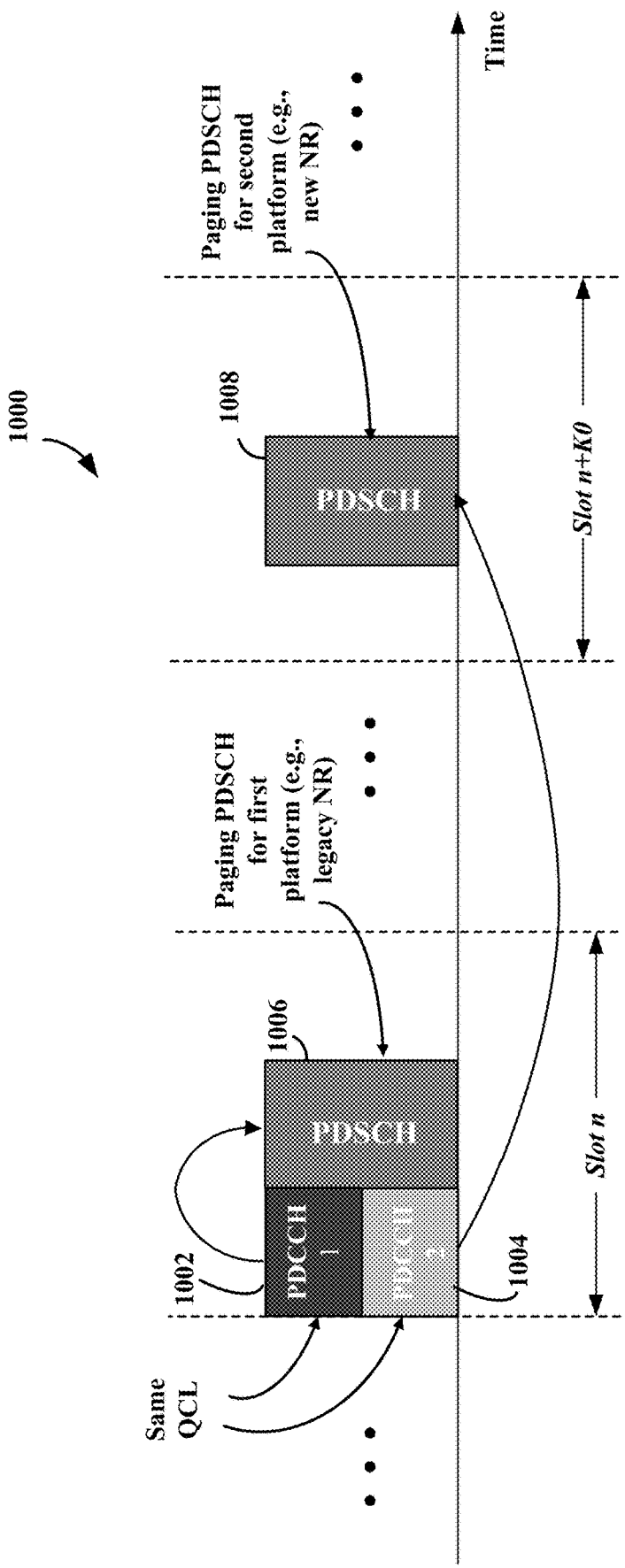
FIG. 10 shows a diagram illustrating paging PDCCH monitoring and occasion sharing according to some aspects.

FIG. 10 shows a diagram 1000 illustrating paging PDCCH monitoring and occasion sharing according to some aspects. In this example, the same PDCCH monitoring occasion (i.e., the same quasi co-location (QCL) information) is shared by existingexisting NR and new NR UEs, but different DCIs are used for existingexisting NR and new NR UEs, such as different RNTI, different DCI format, different PDCCH candidates, etc. In this example, the existing NR and new NR paging messages may be configured with the same QCL information provided to different portions of the same PDCCH occasion PDCCH1 1002, and PDCCH2 1004. The existing NR paging message may be provided from PDCCH1 1002 to PDSCH 1006 for processing within slot n, while the new NR paging message may be provided from PDCCH2 1006 to PDSCH 1008 in slot n+K0 as is shown in the figure.

Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred. QCL-TypeB and QCL-TypeC may also indicate reference signals (e.g., SSB, CSI-RS, or SRS) from which specific LSPCPs (e.g., Doppler shift and/or Doppler spread for QCL-TypeB and average delay and/or delay spread for QCL-TypeC) may be inferred. QCL-TypeD may indicate a spatial RX parameter (e.g., spatial property of the beam on which a downlink/uplink channel or signal is transmitted). The spatial property of the beam may be inferred from the beam utilized for transmission of a reference signal (e.g., SSB, CSI-RS, or SRS) and may indicate, for example, at least one of a beam direction or a beam width.

Figure 11:
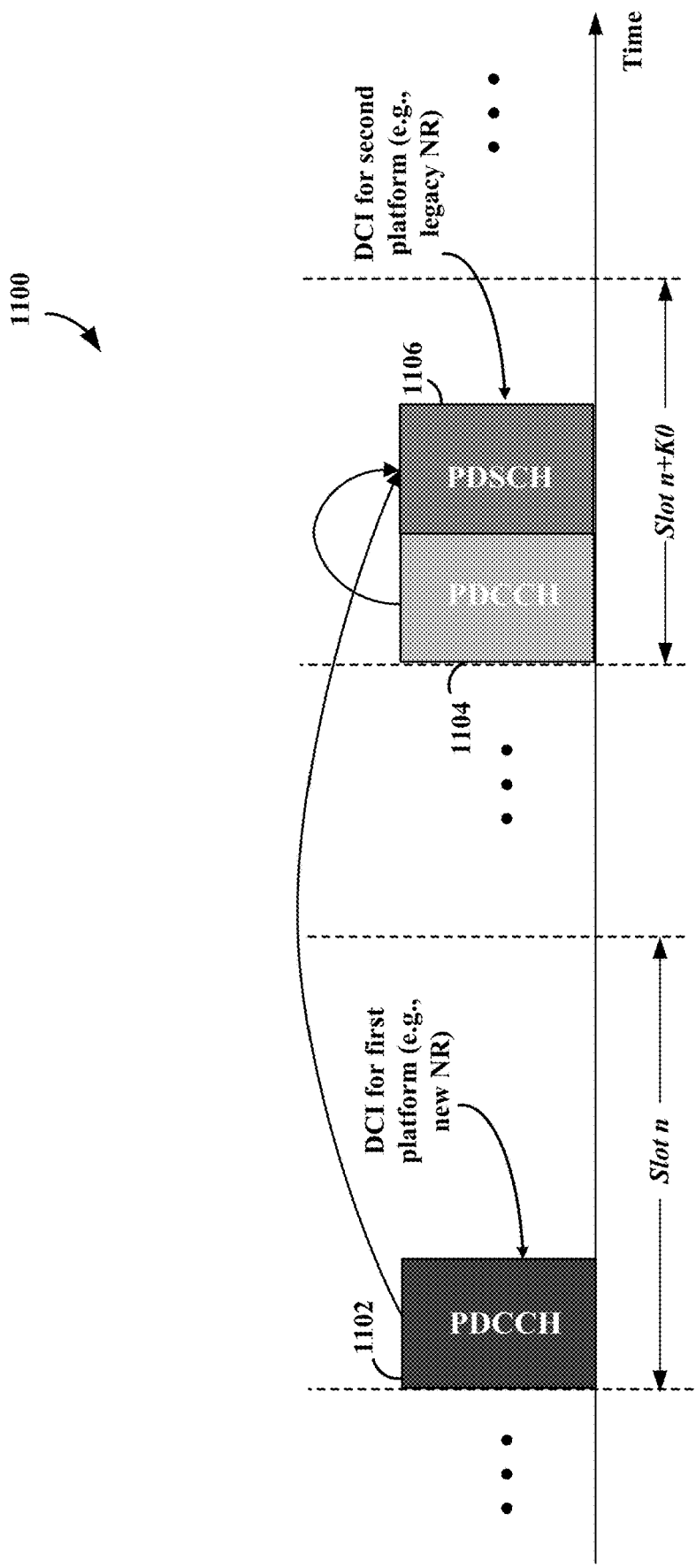
FIG. 11 shows a diagram of a paging message PDSCH that is shared between an LTE and 5G NR operating environment according to some aspects.

FIG. 11 shows a diagram 1100 of a paging message PDSCH that is shared between a first-platform NR (e.g., Rel-15, 16) and new, second-platform NR (e.g., Rel-17 and later) operating environment according to some aspects. In this example, a DCI for a first operating platform or operating environment is received in PDCCH 1102 in a first time slot (slot n), and DCI for a second operating platform or operating environment is received in PDCCH 1104 in an offset time slot slot n+K0 as shown in the figure. Here, the DCI of PDCCH 1104 in slot n and the DCI of PDCCH 112 in offset time slot slot n+K0 may both include respective paging control information (paging DCIs) including a time domain resource allocation for PDSCH 1106 in offset time slot slot n+K0. Here, two different paging DCIs (1102, 1106) may be configured to schedule the same paging data (e.g., PDSCH 1106) when two different operating platforms or operating environments (e.g., existing NR and new NR) need to be simultaneously paged.

Figure 12:
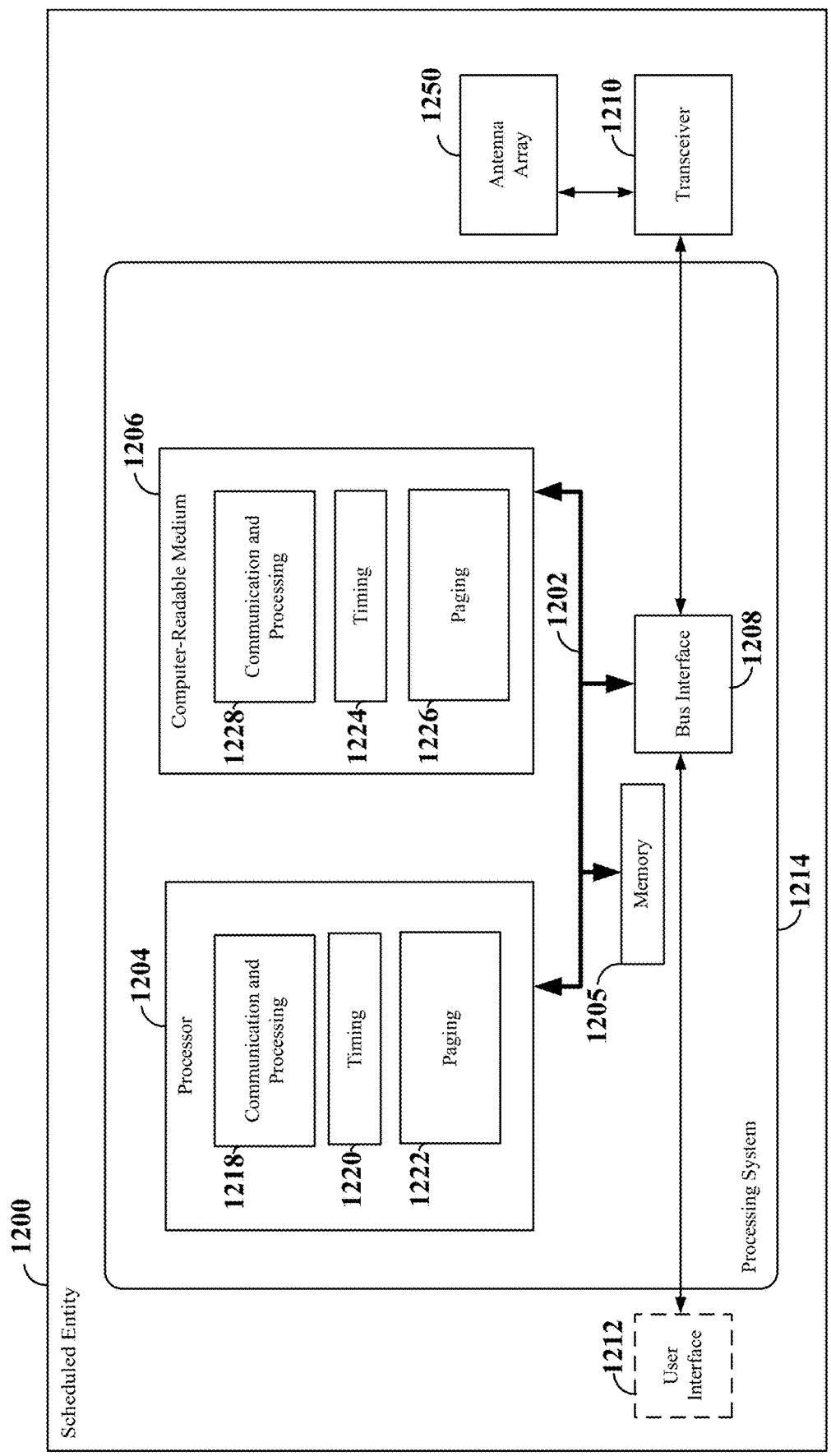
FIG. 12 is a block diagram illustrating an example of a hardware implementation for a scheduled entity employing a processing system according to some aspects.

FIG. 12 is a block diagram illustrating an example of a hardware implementation for a scheduled entity (UE) 1200 employing a processing system 1214 according to some aspects. For example, the scheduled entity 1200 may be a user equipment (UE) as illustrated in any one or more of FIGS. 1 and/or 2.

The scheduled entity 1200 may be implemented with a processing system 1214 (or "processing apparatus") that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1200 may be configured to perform any one or more of the functions described herein, including, but not limited to, power measurement, power sharing, UL timing and offset timing. That is, the processor 1204, as utilized in the scheduled entity 1200, may be used to implement any one or more of the processes and procedures described herein.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202, a transceiver 1210, and an antenna array 1250. The transceiver 1210 provides a communication interface or means for communicating with various other apparatus over a transmission medium. Depending upon the nature of the apparatus, a user interface 1212 (e.g., keypad, display, speaker, microphone, joystick) may also be provided. Of course, such a user interface 1212 is optional, and may be omitted in some examples.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store a list of one or more allowed network slices 1220 (e.g., allowed-NSSAI(s)), a list of one or more activated network slices 1222, and a default RACH resource 1224 used by the processor 1204.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. In some examples, the computer-readable medium 1206 may be part of the memory 1205. Those skilled in the art will recognize how best to implement the described functionality presented throughout this disclosure depending on the particular application and the overall design constraints imposed on the overall system.

In some aspects of the disclosure, processor 1204 may include circuitry configured for various functions. For example, the processor 1204 may include communication and processing circuitry 1218, configured to communicate with a base station (e.g., gNB or eNB) via a Uu link. In some examples, the communication and processing circuitry 1218 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1218 may include one or more transmit/receive chains.

In some implementations where the communication involves receiving information, the communication and processing circuitry 1218 may obtain information from a component of the wireless communication device 1200 (e.g., from the transceiver 1210 that receives the information via radio frequency signaling or some other type of signaling suitable for the applicable communication medium), process (e.g., decode) the information, and output the processed information. For example, the communication and processing circuitry 1218 may output the information to another component of the processor 1204, to the memory 1205, or to the bus interface 1208. In some examples, the communication and processing circuitry 1218 may receive one or more of signals, messages, other information, or any combination thereof. In some examples, the communication and processing circuitry 1218 may receive information via one or more channels. In some examples, the communication and processing circuitry 1218 may include functionality for a means for receiving. In some examples, the communication and processing circuitry 1218 may include functionality for a means for processing, including a means for demodulating, a means for decoding, etc.

In some implementations where the communication involves sending (e.g., transmitting) information, the communication and processing circuitry 1218 may obtain information (e.g., from another component of the processor 1204, the memory 1205, or the bus interface 1208), process (e.g., modulate, encode, etc.) the information, and output the processed information. For example, the communication and processing circuitry 1218 may output the information to the transceiver 1210 (e.g., that transmits the information via radio frequency signaling or some other type of signaling suitable for the applicable communication medium). In some examples, the communication and processing circuitry 1218 may send one or more of signals, messages, other information, or any combination thereof. In some examples, the communication and processing circuitry 1218 may send information via one or more channels. In some examples, the communication and processing circuitry 1218 may include functionality for a means for sending (e.g., a means for transmitting). In some examples, the communication and processing circuitry 1218 may include functionality for a means for generating, including a means for modulating, a means for encoding, etc.

In some examples, the communication and processing circuitry 1218 may be configured to communicate (e.g., transmit/receive) beamformed signals at a mmWave frequency or a sub-6 GHz frequency via the transceiver 1210 and the antenna array 1250. The communication and processing circuitry 1218 may further be configured to execute communication and processing instructions (software) 1228 stored in the computer-readable medium 1206 to implement one or more of the functions described herein.

The processor 1204 may further include timing circuitry 1220 configured to implement, for example, paging and timing procedures described herein, such as technologies and techniques described in FIGS. 6-11 above. The timing circuitry 1220 may further be configured execute timing instructions (software) 1224 stored in the computer-readable medium 1206 to implement one or more of the functions described herein.

The processor 1204 may further include paging circuitry 1222, which may be configured, for example, to process paging messages, such as those described herein, and techniques described in FIGS. 6-11 above. The paging circuitry 1222 may further be configured to execute paging instructions (software) 1226 stored in the computer-readable medium 1206 to implement one or more of the functions described herein.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1-2 and 4, and utilizing, for example, the processes and/or algorithms described herein.

Figure 13:
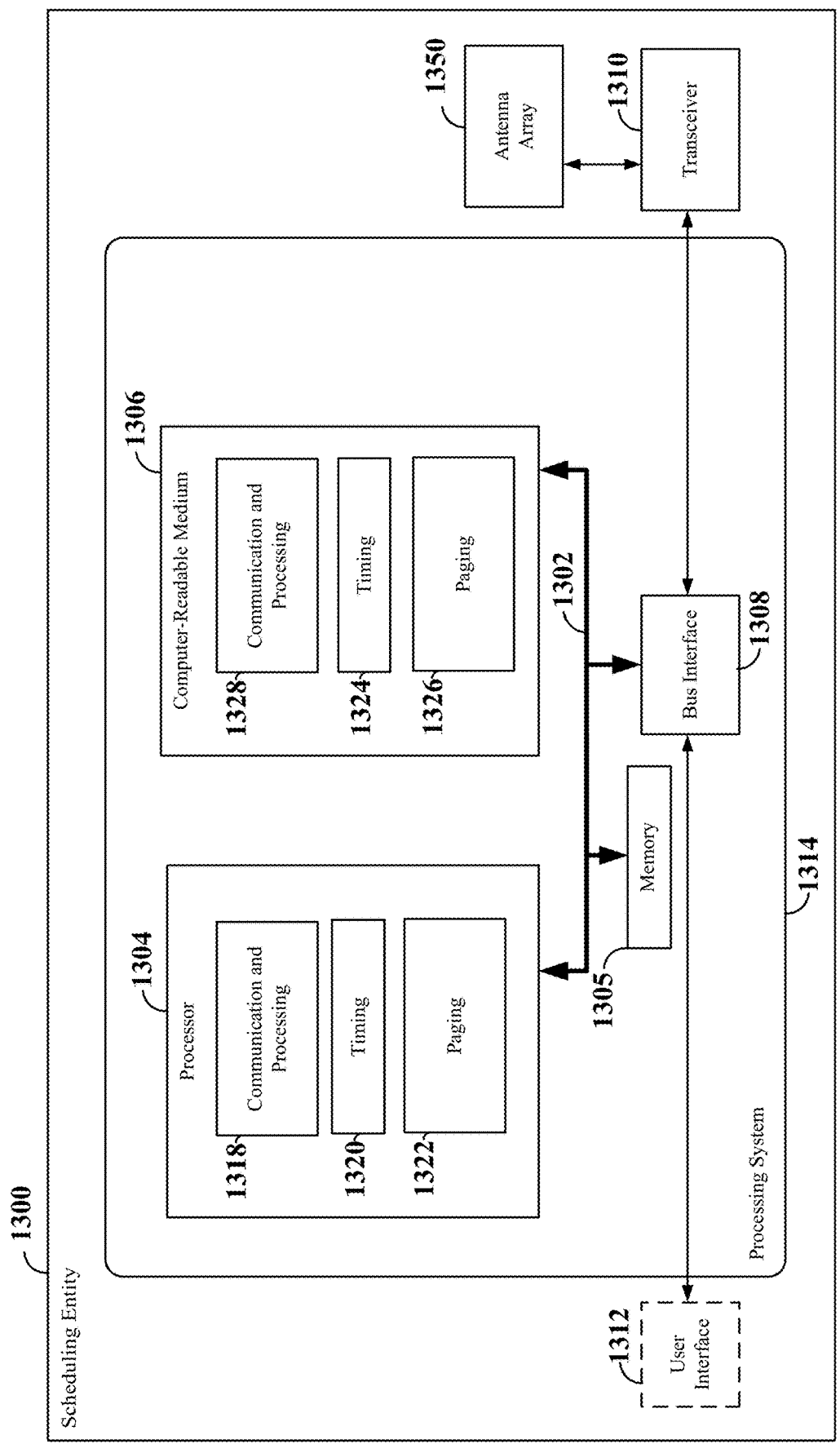
FIG. 13 is a block diagram illustrating an example of a hardware implementation for a scheduling entity employing a processing system according to some aspects.

FIG. 13 is a block diagram illustrating an example of a hardware implementation for a scheduling entity 1300 employing a processing system according to some aspects. The scheduling entity 1300 is shown employing a processing system 1314. For example, the scheduling entity 1300 may be a base station (such as eNB, gNB), or other scheduling entity as illustrated in any one or more of FIGS. 1 and 2.

The scheduling entity 1300 may be implemented with a processing system 1314 similar to processing system 1214 discussed above in connection with FIG. 12, including a bus interface 1308, a bus 1302, memory 1305, a processor 1304, and a computer-readable medium 1306. Furthermore, the base station 1300 may include an optional user interface 1312, a transceiver 1310, and an antenna array 1350 substantially similar to those described above in FIG. 12. The processor 1304, as utilized in the scheduling entity 1300, may be used to implement any one or more of the processes described herein.

In some aspects of the disclosure, the processor 1304 may include circuitry configured for various functions. For example, the processor 1304 may include communication and processing circuitry 1318, which may be configured similarly to circuitry 1218 described above in connection with FIG. 12. The communication and processing circuitry 1318 may further be configured to execute communication and processing instructions (software) 1328 stored in the computer-readable medium 1306 to implement one or more of the functions described herein.

The processor 1304 may further include timing circuitry 1320, configured to implement, for example, timing processing relating to paging messaging procedures described herein, such as technologies and techniques described in FIGS. 6-11 above. The timing circuitry 1320 may further be configured execute timing instructions (software) 1324 stored in the computer-readable medium 1306 to implement one or more of the functions described herein.

The processor may further include paging circuitry 1322, which may be configured, for example, to implement paging messaging processing, such as those described herein, and techniques described in FIGS. 6-11 above. The paging circuitry 1322 may further be configured to execute paging instructions (software) 1326 stored in the computer-readable medium 1306 to implement one or more of the functions described herein.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1-2 and 4, and utilizing, for example, the processes and/or algorithms described herein.

Figure 14:
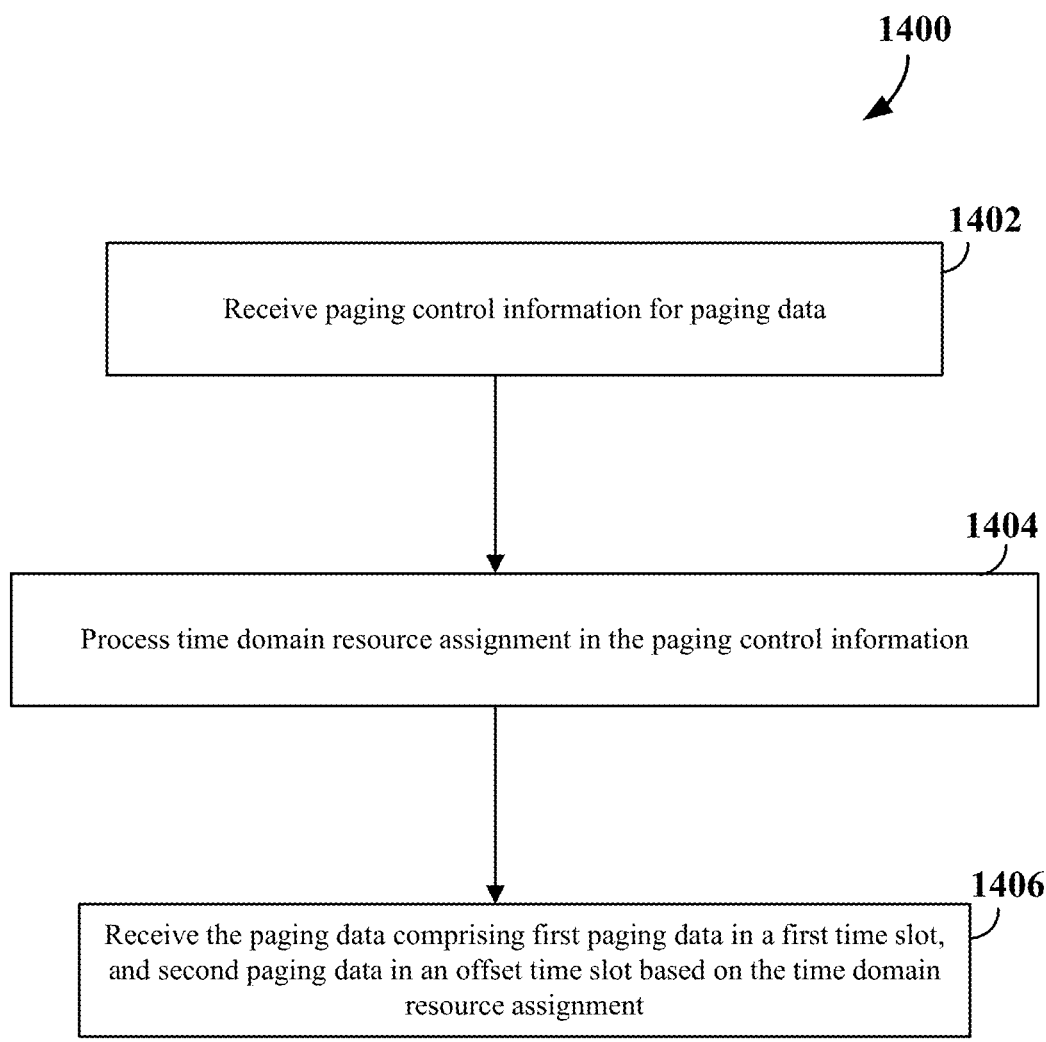
FIG. 14 is a flow chart illustrating a method for processing paging messages for dynamic power sharing in a scheduled entity according to some aspects.

FIG. 14 is a flow chart 1400 illustrating a method for processing paging messages for dynamic power sharing in a scheduled entity according to some aspects. As described below, some or all illustrated features may be omitted in a particular implementation within the scope of the present disclosure, and some illustrated features may not be required for implementation of all embodiments. In some examples, the process 1400 may be carried out by the scheduled entity 1200 illustrated in FIG. 12. In some examples, the process 1400 may be carried out by any suitable apparatus or means for carrying out the functions or algorithm described below.

In block 1402, the scheduled entity may receive paging control information for paging data. In some examples, the paging control information may be received in DCI of a PDCCH. In some examples, the paging control information may include a first paging control portion and a second paging control portion co-located in a same paging occasion. The first paging control portion and the second paging control portion may be configured with different control information. In some examples, the first paging control portion and the second paging control portion may be configured with same QCL information In some examples, the scheduled entity may receive the paging control information for the paging data based on the scheduled entity being in an idle mode or an inactive mode. For example, the paging circuitry 1222, together with the communication and processing circuitry 1218 and transceiver 1210, shown and described above in connection with FIG. 12 may provide a means to receive control information for paging data.

In block 1404, the scheduled entity may process a time domain resource assignment (TDRA) in the paging control information. In some examples, the first paging control portion includes a first time domain resource assignment for the first paging data in the first time slot and the second paging control portion includes a second time domain resource assignment for the second paging data in the offset slot. For example, the timing circuitry 1220 shown and described above in connection with FIG. 12 may provide a means to process time domain resource assignment.

In block 1406, the scheduled entity may receive the paging data that includes first paging data in a first time slot, and second paging data in an offset time slot based on the time domain resource assignment (TDRA). In some examples, the scheduled entity may receive the paging data in a physical downlink shared channel (PDSCH). In some examples, the scheduled entity may receive the first paging data in a first PDSCH in the first slot, and the second paging data in a second PDSCH in the offset time slot. For example, the paging circuitry 1222 and transceiver 1210 shown and described above in connection with FIG. 12 may provide a means to receive the paging data.

Figure 15:
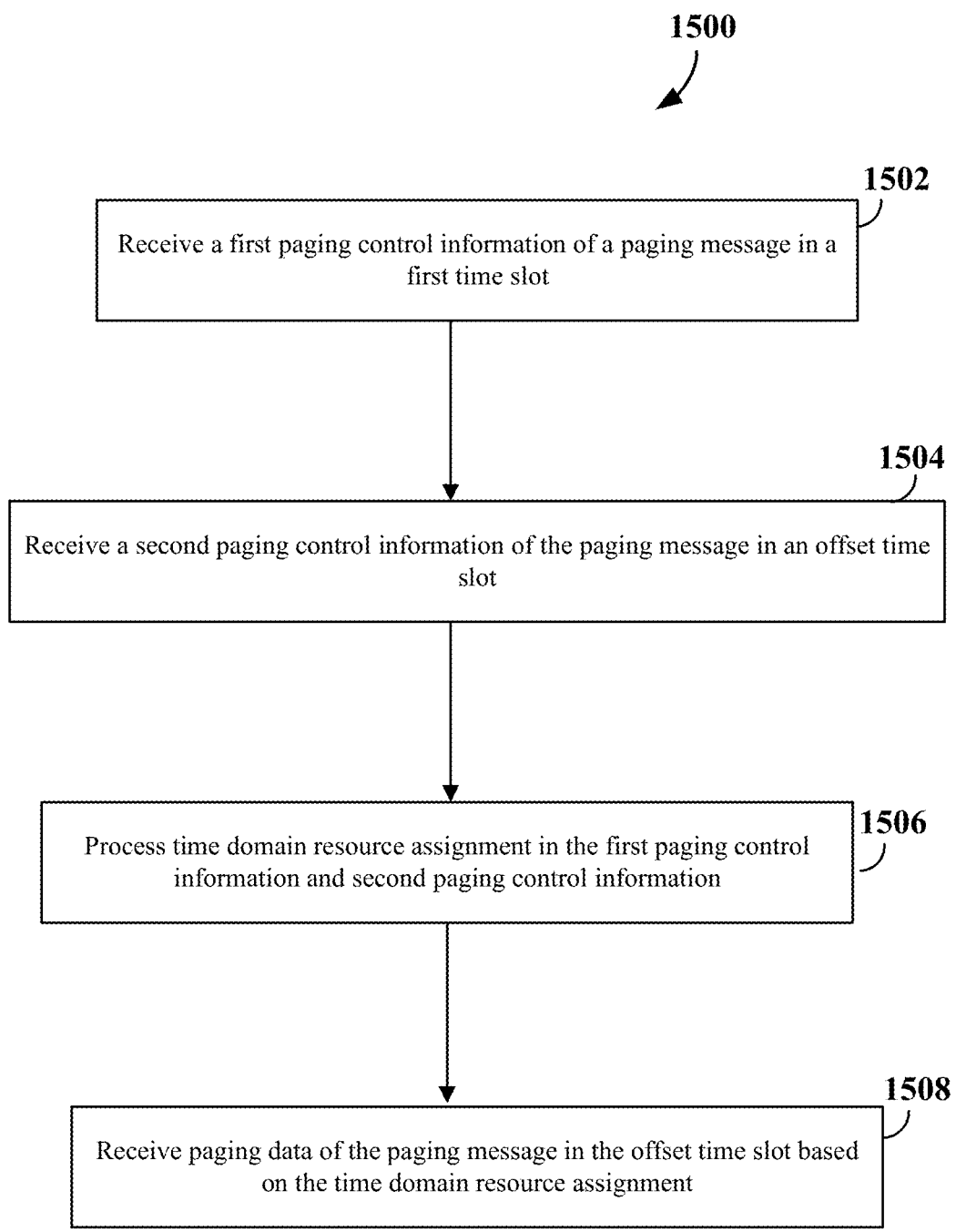
FIG. 15 is a flow chart illustrating a method for processing paging messages with a plurality of paging control information for dynamic power sharing in a scheduled entity according to some aspects.

FIG. 15 is a flow chart 1500 illustrating a method for processing paging messages with a plurality of paging control information for dynamic power sharing in a scheduled entity according to some aspects. As described below, some or all illustrated features may be omitted in a particular implementation within the scope of the present disclosure, and some illustrated features may not be required for implementation of all embodiments. In some examples, the process 1500 may be carried out by the scheduled entity 1200 illustrated in FIG. 12. In some examples, the process 1400 may be carried out by any suitable apparatus or means for carrying out the functions or algorithm described below.

In block 1502, a scheduled entity may receive first paging control information of a paging message in a first time slot. In some examples, the first paging control information may be received in first DCI of a first PDCCH. For example, the paging circuitry 1222, together with the communication and processing circuitry 1218 and transceiver 1210, shown and described above in connection with FIG. 12 may provide a means to receive first paging control information of a paging message.

In block 1504, the scheduling entity may receive a second paging control information of the paging message in an offset time slot. In some examples, the second paging control information may be received in second DCI of a second PDCCH. In some examples, the first paging control information and the second paging control information are different. In some examples, the first paging control information and the second paging control information for the paging data are received based on the scheduled entity being in an idle mode or an inactive mode. For example, the paging circuitry 1222 and communication and processing circuitry 1218 and transceiver 1210, shown and described above in connection with FIG. 12 may provide a means to receive second paging control information of a paging message.

In block 1506, the scheduling entity may process time domain resource assignment (TDRA) in the first paging control information and second paging control information. In some examples, the time domain resource assignment in the first paging control information and second paging control information are processed simultaneously. For example, the paging circuitry 1222 and timing circuitry 1224 shown and described above in connection with FIG. 12 may provide a means to process time domain resource assignment.

In block 1508, the scheduled entity may receive paging data of the paging message in the offset time slot based on the time domain resource assignment. In some examples, the paging data may be received in a PDSCH. The paging data may be received in a first portion of the paging data in a first PDSCH in the first time slot, and received in a second portion of the paging data in a second PDSCH in the offset time slot. For example, the paging circuitry 1222, transceiver 1210, and timing circuitry 1224 shown and described above in connection with FIG. 12 may provide a means to receive paging data of the paging message in the offset time slot based on the time domain resource assignment.

In one configuration, a scheduled entity configured for wireless communication includes means for processing paging messages, as described in the present disclosure. In one example, the aforementioned means may be the processor 1204 shown in FIG. 12 configured to perform the functions recited by the aforementioned means. In another example, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 2, 4, and/or 12, and utilizing, for example, the processes and/or algorithms described herein in relation to FIGS. 14 and 15.

The processes shown in FIGS. 14-15 may include additional aspects, such as any single aspect or any combination of aspects described below and/or in connection with one or more other processes described elsewhere herein.

Aspect 1: A method of sharing paging messages in a scheduled entity, comprising: receiving paging control information for paging data; processing a time domain resource assignment in the paging control information; and receiving the paging data comprising first paging data in a first time slot, and second paging data in an offset time slot based on the time domain resource assignment.

Aspect 2: The method of aspect 1, wherein the receiving the paging control information comprises receiving the paging control information in downlink control information (DCI) of a Physical Downlink Control Channel (PDCCH).

Aspect 3: The method of aspect 1 or 2, wherein the receiving the paging data comprises receiving the paging data in a physical downlink shared channel (PDSCH).

Aspect 4: The method of any of aspects 1 through 3, wherein the receiving the paging data comprises receiving the first paging data in a first physical downlink shared channel (PDSCH) in the first time slot, and the second paging data in a second PDSCH in the offset time slot.

Aspect 5: The method of any of aspects 1 through 4, wherein the paging control information comprises a first paging control portion and a second paging control portion co-located in a same paging occasion.

Aspect 6: The method of any of aspects 1 through 5, wherein the first paging control portion and the second paging control portion comprise different control information.

Aspect 7: The method of any of aspects 1 through 6, wherein the first paging control portion and the second paging control portion are configured with a same quasi co-location (QCL) information.

Aspect 8: The method of any of aspects 1 through 7, wherein the first paging control portion comprises a first time domain resource assignment for the first paging data in the first time slot, and the second paging control portion comprises a second time domain resource assignment for the second paging data in the offset time slot.

Aspect 9: The method of any of aspects 1 through 8, wherein the receiving the paging control information further comprises receiving the paging control information for the paging data based on the scheduled entity being in an idle mode or an inactive mode.

Aspect 10: A method of sharing paging messages in a scheduled entity, comprising: receiving first paging control information of a paging message in a first time slot; receiving second paging control information of the paging message in an offset time slot; processing a time domain resource assignment in the first paging control information and the second paging control information; and receiving paging data of the paging message in the offset time slot based on the time domain resource assignment.

Aspect 11: The method of aspect 10, wherein the receiving the first paging control information comprises receiving the first paging control information in first downlink control information (DCI) of a first Physical Downlink Control Channel (PDCCH); and the receiving the second paging control information comprises receiving the second paging control information in second downlink control information (DCI) of a second Physical Downlink Control Channel (PDCCH).

Aspect 12: The method of aspect 10 or 11, wherein the receiving the paging data comprises receiving the paging data in a Physical Downlink Shared Channel (PDSCH).

Aspect 13: The method of any of aspects 10 through 12, wherein the first paging control information and the second paging control information are different.

Aspect 14: The method of any of aspects 10 through 13, wherein the receiving the paging data comprises receiving a first portion of the paging data in a first Physical Downlink Shared Channel (PDSCH) in the first time slot, and receiving a second portion of the paging data in a second PDSCH in the offset time slot.

Aspect 15: The method of any of aspects 10 through 14, wherein the first paging control information and the second paging control information for the paging data are received based on the scheduled entity being in an idle mode or an inactive mode.

Aspect 16: The method of any of aspects 10 through 15, wherein the time domain resource assignment in the first paging control information and second paging control information are processed simultaneously.

Aspect 17: A scheduled entity for processing paging messages, comprising a memory, a transceiver, and a processor, wherein the processor and the memory are configured to perform a method of any one of aspects 1 through 9 or aspects 10 through 16.

Aspect 18: An apparatus for processing paging messages comprising at least one means for performing a method of any one of aspects 1 through 9 or aspects 10 through 16.

Aspect 19: A non-transitory computer-readable medium having stored therein instructions executable by one or more processors of a scheduled entity to perform a method of any one of aspects 1 through 9 or aspects 10 through 16.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 12, and 13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method, comprising:
   receiving paging control information in downlink control information (DCI) of a Physical Downlink Control Channel (PDCCH), for paging data;
   processing a time domain resource assignment in the paging control information; and
   receiving the paging data in a physical downlink shared channel (PDSCH), the paging data comprising shared paging data that comprises first paging data in a first time slot, and second paging data in an offset time slot based on the time domain resource assignment.

2. The method of claim 1, wherein the receiving the paging data comprises receiving the first paging data in a first physical downlink shared channel (PDSCH) in the first time slot, and the second paging data in a second PDSCH in the offset time slot.

3. The method of claim 1, wherein the paging control information comprises a first paging control portion and a second paging control portion co-located in a same paging occasion.

4. The method of claim 3, wherein the first paging control portion and the second paging control portion comprise different control information.

5. The method of claim 3, wherein the first paging control portion and the second paging control portion are configured with a same quasi co-location (QCL) information.

6. The method of claim 3, wherein the first paging control portion comprises a first time domain resource assignment for the first paging data in the first time slot, and the second paging control portion comprises a second time domain resource assignment for the second paging data in the offset time slot.

7. The method of claim 1, wherein the receiving the paging control information further comprises receiving the paging control information for the paging data based on the scheduled entity being in an idle mode or an inactive mode.

8. A scheduled entity for processing paging messages, comprising:
   a memory;
   a transceiver; and
   a processor, wherein the processor and the memory are configured to:
      receive paging control information in downlink control information (DCI) of a Physical Downlink Control Channel (PDCCH) for paging data;
      process a time domain resource assignment in the paging control information; and
      receive the paging data in a physical downlink shared channel (PDSCH), the paging data comprising shared paging data that comprises first paging data in a first time slot, and second paging data in an offset time slot based on the time domain resource assignment.

9. The scheduled entity of claim 8, wherein the processor and the memory are configured to receive the first paging data in a first physical downlink shared channel (PDSCH) in the first time slot, and the second paging data in a second PDSCH in the offset time slot.

10. The scheduled entity of claim 8, wherein the paging control information comprises a first paging control portion and a second paging control portion co-located in a same paging occasion.

11. The scheduled entity of claim 10, wherein the first paging control portion and the second paging control portion comprise different control information.

12. The scheduled entity of claim 10, wherein the first paging control portion and the second paging control portion are configured with a same quasi co-location (QCL) information.

13. The scheduled entity of claim 10, wherein the first paging control portion comprises a first time domain resource assignment for the first paging data in the first time slot, and the second paging control portion comprises a second time domain resource assignment for the second paging data in the offset time slot.

14. The scheduled entity of claim 8, wherein the processor and the memory are configured to receive the paging control information for the paging data based on the scheduled entity being in an idle mode or an inactive mode.

15. A method of sharing paging messages in a scheduled entity, comprising:
   receiving first paging control information in first downlink control information (DCI) of a first Physical Downlink Control Channel (PDCCH) of a paging message in a first time slot;
   receiving second paging control information in second downlink control information (DCI) of a second Physical Downlink Control Channel (PDCCH) of the paging message in an offset time slot;
   processing a time domain resource assignment in the first paging control information and the second paging control information; and
   receiving paging data of the paging message in a Physical Downlink Shared Channel (PDSCH) in the offset time slot based on the time domain resource assignment.

16. The method of claim 15, wherein the first paging control information and the second paging control information are different.

17. The method of claim 15, wherein the receiving the paging data comprises receiving a first portion of the paging data in a first Physical Downlink Shared Channel (PDSCH) in the first time slot, and receiving a second portion of the paging data in a second PDSCH in the offset time slot.

18. The method of claim 15, wherein the first paging control information and the second paging control information for the paging data are received based on the scheduled entity being in an idle mode or an inactive mode.

19. The method of claim 15, wherein the time domain resource assignment in the first paging control information and second paging control information are processed simultaneously.

20. A scheduled entity for processing paging messages, comprising:
   a memory;
   a transceiver; and
   a processor, wherein the processor and the memory are configured to:
      receive first paging control information in first downlink control information (DCI) of a first Physical Downlink Control Channel (PDCCH) of a paging message in a first time slot;
      receive second paging control information in second downlink control information (DCI) of a second Physical Downlink Control Channel (PDCCH) of the paging message in an offset time slot;
      process a time domain resource assignment in the first paging control information and the second paging control information; and
      receive paging data of the paging message in a Physical Downlink Shared Channel (PDSCH) in the offset time slot based on the time domain resource assignment.

21. The scheduled entity of claim 20, wherein the first paging control information and the second paging control information are different.

22. The scheduled entity of claim 20, wherein the processor and the memory are configured to receive a first portion of the paging data in a first Physical Downlink Shared Channel (PDSCH) in the first time slot, and receiving a second portion of the paging data in a second PDSCH in the offset time slot.

* * * * *